(12) United States Patent
Kugel et al.

(10) Patent No.: US 9,932,476 B2
(45) Date of Patent: Apr. 3, 2018

(54) PAVEMENT MARKING COMPOSITIONS

(71) Applicant: 3M INNOVATIVE PROPERTIES COMPANY, St. Paul, MN (US)

(72) Inventors: Alexander J. Kugel, Woodbury, MN (US); Eugene H. Carlson, Apple Valley, MN (US); Matthew D. Wilding, White Bear Lake, MN (US); Rajdeep S. Kalgutkar, Woodbury, MN (US); Pamela A. Percha, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/439,301

(22) PCT Filed: Mar. 13, 2013

(86) PCT No.: PCT/US2013/030929
§ 371 (c)(1),
(2) Date: Apr. 29, 2015

(87) PCT Pub. No.: WO2014/070229
PCT Pub. Date: May 8, 2014

(65) Prior Publication Data
US 2015/0252195 A1  Sep. 10, 2015

Related U.S. Application Data

(60) Provisional application No. 61/719,800, filed on Oct. 29, 2012.

(51) Int. Cl.
| *C08L 93/04* | (2006.01) |
| *C08L 83/04* | (2006.01) |
| *C09D 183/10* | (2006.01) |
| *C09D 193/04* | (2006.01) |
| *C09J 193/04* | (2006.01) |
| *C08G 77/455* | (2006.01) |

(52) U.S. Cl.
CPC .............. *C08L 93/04* (2013.01); *C08L 83/04* (2013.01); *C09D 183/10* (2013.01); *C09D 193/04* (2013.01); *C09J 193/04* (2013.01); *C08G 77/455* (2013.01)

(58) Field of Classification Search
CPC .. C09D 143/04; C09D 143/08; C09D 143/10; C09D 5/005; C09D 183/04–183/12; C08G 77/455; C08K 3/40; C09J 183/10
See application file for complete search history.

(56) References Cited

U.S. PATENT DOCUMENTS

| 3,043,196 A | 7/1962 | Palmquist |
| 3,171,827 A | 3/1965 | De Vries |
| 3,279,336 A | 10/1966 | Eaton |
| 3,393,615 A | 7/1968 | Micheln |
| 3,523,029 A * | 8/1970 | Ryan ...................... C09D 5/004 106/237 |
| 3,556,637 A | 1/1971 | Palmquist |
| 3,679,626 A * | 7/1972 | Tanekusa et al. ........ E01F 9/506 260/998.19 |
| 3,874,801 A | 4/1975 | White |
| 3,890,269 A | 6/1975 | Martin |
| 3,902,666 A | 9/1975 | Ito |
| 4,117,192 A | 9/1978 | Jorgensen |
| 4,248,932 A | 2/1981 | Tung |
| 4,301,050 A | 11/1981 | Masuda et al. |
| 4,324,711 A * | 4/1982 | Tanaka .................... C08L 77/08 106/219 |
| 4,388,359 A | 6/1983 | Ethen |
| 4,490,432 A | 12/1984 | Jordan |
| 4,564,556 A | 1/1986 | Lange |
| 4,661,577 A | 4/1987 | Jo Lane |
| 4,681,401 A | 7/1987 | Wyckoff |
| 4,758,469 A | 7/1988 | Lange |
| 4,969,713 A | 11/1990 | Wyckoff |
| 4,988,555 A | 1/1991 | Hedblom |
| 5,026,890 A | 6/1991 | Webb |
| 5,087,148 A | 2/1992 | Wyckoff |
| 5,108,218 A | 4/1992 | Wyckoff |
| 5,139,590 A | 8/1992 | Wyckoff |
| 5,194,113 A | 3/1993 | Lasch |
| 5,214,119 A | 5/1993 | Leir |
| 5,276,122 A | 1/1994 | Aoki |
| 5,407,986 A | 4/1995 | Farukawa |
| 5,461,134 A | 10/1995 | Leir |
| 5,512,650 A | 4/1996 | Leir |
| 5,557,461 A | 9/1996 | Wyckoff |
| 5,563,569 A | 10/1996 | Pellegrino |
| 5,643,655 A | 7/1997 | Passarino |
| 5,942,280 A | 8/1999 | Mathers |
| 6,036,764 A * | 3/2000 | Gooding ............. C09B 67/0033 106/31.04 |
| 6,245,700 B1 | 6/2001 | Budd |
| 6,355,759 B1 | 3/2002 | Sherman |
| 6,503,632 B1 | 1/2003 | Hayashi |
| 6,511,739 B2 | 1/2003 | Kasai |
| 6,531,620 B2 | 3/2003 | Brader |
| 7,371,464 B2 * | 5/2008 | Sherman ................ C08G 69/42 428/447 |
| 7,513,941 B2 | 4/2009 | Frey |

(Continued)

FOREIGN PATENT DOCUMENTS

| EP | 1295926 A1 | 3/2003 |
| JP | 11209619 | 8/1999 |
| WO | WO 2013-033302 | 3/2013 |

OTHER PUBLICATIONS

Sylvacote 7003 Product Data Sheet. Arizona Chemical. May 2009.*

(Continued)

*Primary Examiner* — Stephen E Rieth
(74) *Attorney, Agent, or Firm* — Trisha D. Adamson

(57) ABSTRACT

A composition comprises a blend comprising (a) a binder comprising (i) C5 hydrocarbon resin or (ii) a resin comprising rosin acids, rosin esters, modified rosin acids, modified rosin esters or mixtures thereof, and (b) polydimethylsiloxane polyamide copolymer.

18 Claims, No Drawings

(56) References Cited

U.S. PATENT DOCUMENTS

| | | | |
|---|---|---|---|
| 7,524,779 B2 | 4/2009 | Frey | |
| 7,915,370 B2 * | 3/2011 | Sherman | C08G 77/455 428/447 |
| 8,431,668 B2 * | 4/2013 | Sherman | C08G 77/455 428/447 |
| 2003/0051807 A1 | 3/2003 | Yamaguchi | |
| 2004/0081820 A1 | 4/2004 | Hayashi | |
| 2004/0120908 A1 * | 6/2004 | Cohen | A61K 8/0241 424/63 |
| 2004/0127614 A1 | 6/2004 | Jiang | |
| 2004/0180032 A1 * | 9/2004 | Manelski | A61K 8/898 424/70.121 |
| 2005/0245642 A1 * | 11/2005 | Senturk | C03C 3/078 523/172 |
| 2006/0079617 A1 | 4/2006 | Kappes | |
| 2007/0059441 A1 | 3/2007 | Greer | |
| 2007/0092635 A1 | 4/2007 | Huh | |
| 2009/0010868 A1 | 1/2009 | Ilekti et al. | |
| 2010/0055374 A1 * | 3/2010 | Greer | E01F 9/524 428/64.1 |
| 2012/0154811 A1 | 6/2012 | Pokorny | |
| 2012/0175566 A1 | 7/2012 | Sherman et al. | |

OTHER PUBLICATIONS

Safety Assessment of Alkyl Phosphates as Used in Cosmetics. Tentative Report for Public Comment. Cosmetic Ingredient Review. Jun. 18, 2014.*

3M Microspheres Selection Guide. 2015.*

Forch, R., Schonherr, H., Jenkins, A. T. A. Surface Design: Applications in Bioscience and Nanotechnology. Wiley-VCH Verlag GmbH& Co. 2009. pp. 471-473.*

International Search report for PCT International Application No. PCT/US2013/030929 dated Jul. 25 2013, 5 pages.

* cited by examiner

PAVEMENT MARKING COMPOSITIONS

CROSS REFERENCE TO RELATED APPLICATIONS

This application is a national stage filing under 35 U.S.C. 371 of PCT/US2013/030929, filed Mar. 13, 2013, which claims priority to U.S. Provisional Application No. 61/719,800, filed Oct. 29, 2012, the disclosures of which are incorporated by reference in their entirety herein.

FIELD

This invention relates to compositions that are useful as pavement marking compositions.

BACKGROUND

Pavement markings (e.g., paints, tapes, and individually mounted articles) guide and direct motorists and pedestrians traveling along roadways and paths. Paint was a preferred pavement marking for many years. However, modern liquid pavement marking materials offer significant advantages over paint, such as increased visibility, retroreflectance, improved durability, and temporary and/or removable marking options.

Examples of modern pavement marking materials include, for example, thermoplastic pavement marking sheet materials, tapes, compositions and raiser pavement markers. Many thermoplastic pavement markings include maleic-modified rosin ester (MMRE) resins. C5 hydrocarbon resins are also commonly used in pavement markings. In fact, many current government pavement marking specifications around the globe require MMRE resins or C5 hydrocarbon resins.

Pavement markers made with liquid pavement marking materials may include optical elements such as glass beads or microspheres adhered to the pavement surface in order to provide improved retroreflectivity.

SUMMARY

Pavement markings are subject to continuous wear and exposure to the elements as well as road chemicals. One common failure mode of thermoplastic pavement marking systems is their inability to stay white on the road. Although retroreflectivity from glass beads can provide visibility at night, a dirty pavement marking can become ineffective during daylight.

In view of the above, we recognize that there is a need in the art for pavement marking materials that have improved dirt resistance but that will still fall within current government specifications.

Briefly, in one aspect, the present invention relates to a blend comprising (a) a binder comprising (i) C5 hydrocarbon resin or (ii) a resin comprising rosin acids, rosin esters, modified rosin acids, modified rosin esters or mixtures thereof and (b) polydimethylsiloxane polyamide copolymer.

In another aspect, the present invention relates to thermoplastic pavement marking compositions comprising a blend comprising (a) maleic-modified rosin ester resin, (b) polydimethylsiloxane polyamide copolymer, (c) calcium carbonate filler, (d) titanium dioxide or yellow organic pigment, and (e) glass beads.

The compositions of the invention provide improved hydrophobic surface properties and thus may provide for improved whiteness retention and reduced dirt pickup when used in pavement markings thereby improving their performance on the road. Because the compositions of the invention are based upon either C5 hydrocarbon resins or rosin-based resins such as MMRE resins, many will still fall within current government specifications.

In addition, some of the compositions of the invention may be useful as pressure sensitive adhesives.

DETAILED DESCRIPTION

Binder

The compositions of the invention comprise either a C5 hydrocarbon resin or a resin comprising rosin acids, rosin esters, modified rosin acids, modified rosin esters or mixtures thereof. In some embodiments of the invention, the compositions of the invention comprise about 5 or about 10 wt. % to about 20 or about 25 wt. % C5 hydrocarbon resin or rosin resin.

C5 hydrocarbon resins are produced from C5 piperylenes, which are the by-product of naphtha cracking. Liquid C5 piperylene feedstock can be polymerized to form a C5 hydrocarbon resin. C5 hydrocarbon resins are predominately aliphatic materials, but the structure of the resin is difficult to characterize because various isomers of the feedstock can combine unpredictably. C5 hydrocarbon resins can be hydrogenated to improve stability and other properties. As used herein, the term "C5 hydrocarbon resins" includes both hydrogenated and unhydrogenated C5 resins.

Examples of commercially available C5 hydrocarbon resins include PICCOTAC aliphatic hydrocarbon resins and EASTOTAC hydrogenated aliphatic resins such as EASTOTAC H-100E and H-100R, available from Eastman Chemical Company, Kingsport, Tenn.; H1000 and H1001 from Zhongde (Puyang Zhongde Petroleum Resins Co.); and HCR-R5100 and HCR-R5101 from Credrez (Puyang Tiancheng Chemical Co., Ltd.).

Rosin-based resins can include rosin acids, rosin esters, modified rosin acids, modified rosin esters or mixtures thereof with varying degrees of unsaturation. Each of the rosin acids and rosin esters included in the binder typically has three fused carbon rings and has zero, one, two, or three carbon-carbon double bonds.

Rosin acids having three carbon-carbon double bonds include those of Formula (III) or isomers of Formula (III).

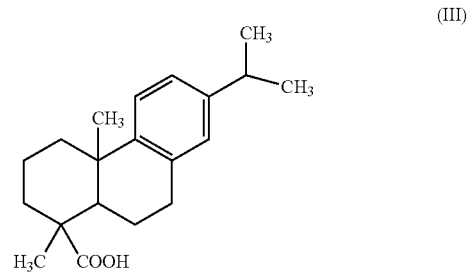 [SMILES: CC(C)c1ccc2c(c1)CCC1C(C)(C(=O)O)CCCC21C]

(III)

The rosin acid of Formula (III) is commonly called dehydroabietic acid.

Rosin acids having two carbon-carbon bonds include those of Formulas (IV) to (X) or isomers of Formulas (IV) to (X).

(IV)
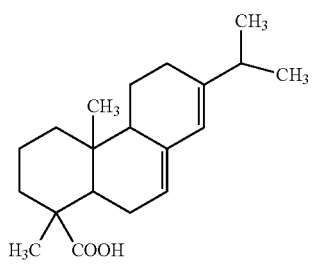

(V)
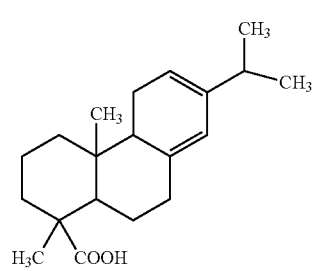

(VI)
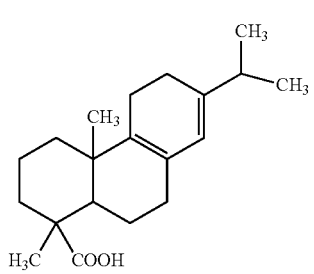

(VII)
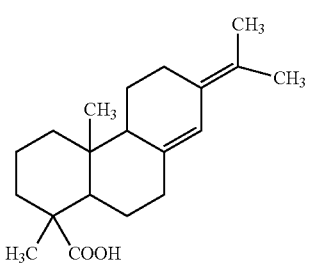

(VIII)
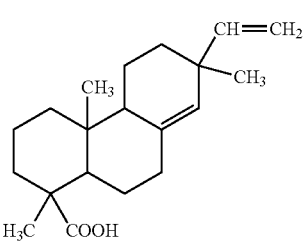

(IX)
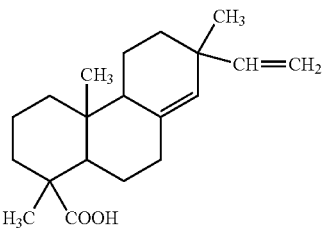

-continued (X)
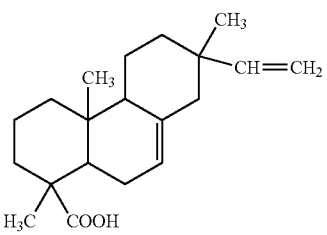

The rosin acid of Formula (IV) is commonly called abietic acid; the rosin acid of Formula (V) is commonly called levopimaric acid; the rosin acid of Formula (VI) is commonly called palustric acid; the rosin acid of Formula (VII) is commonly called neoabietic acid; the rosin acid of Formula (VIII) is commonly called pimaric acid; the rosin acid of Formula (IX) is commonly called sandaracopimaric acid; and the rosin acid of Formula (X) is commonly called isopimaric acid.

Rosin acids having one carbon-carbon double bond include hydrogenated (i.e., dihydro) versions of any of the rosin acids shown in Figures (IV) to (X). For example, the hydrogenation of a single carbon-carbon bond of Formula (IV) can lead to a rosin acid of Formula (XI) or isomers thereof.

(XI)
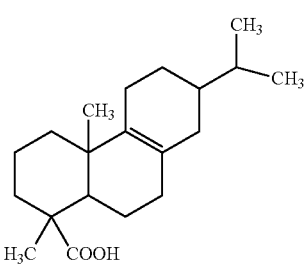

Likewise, the hydrogenation of a single carbon-carbon bond of Formula (VIII) can lead to a rosin acid of Formula (XII) or (XIII) or isomers thereof.

(XII)
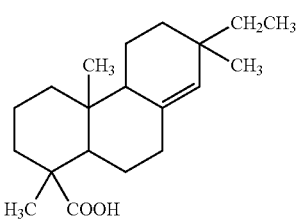

(XIII)
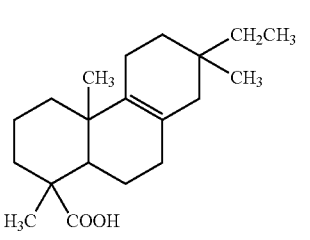

Hydrogenation of two of the double bonds of a rosin acid of Formula (III) with an aromatic ring can result in the formation of any of the following rosin acids of Formulas (XI), (XIV), or (XV).

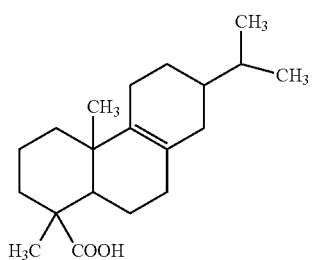

(XI)

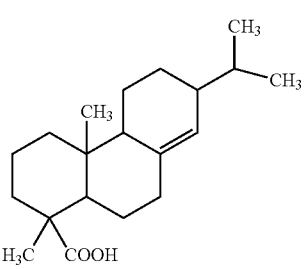

(XIV)

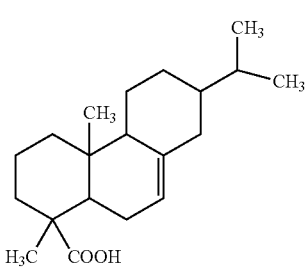

(XV)

Rosin acids having no carbon-carbon double bonds include a hydrogenated (i.e., tetrahydro) version of any of the rosin acids shown in Formulas (IV) to (X) or isomers thereof. For example, the hydrogenation of both carbon-carbon bonds of Formula (IV) can lead to a compound of Formula (XVI) or isomers thereof.

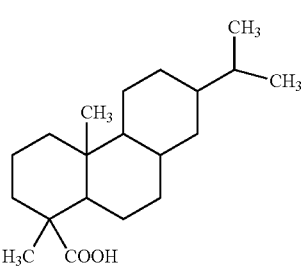

(XVI)

This same rosin acid results from the complete hydrogenation of the rosin acid of Formula (III). Likewise, the hydrogenation of both carbon-carbon bonds of Formula (VIII) can lead to a compound of Formula (XVII) or isomers thereof.

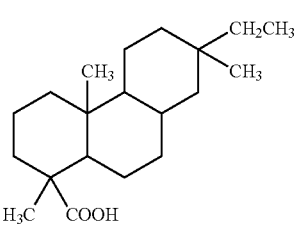

(XVII)

The corresponding rosin esters of any of these rosin acids are usually formed by reacting an alcohol or polyol with the rosin acid. Exemplary alcohols or polyols often have 1 to 20 carbon atoms and 1 to 5 hydroxyl groups. The alcohol or polyol can be saturated or unsaturated. The polyol is often an aliphatic polyol such as, an alkane substituted with multiple hydroxy groups. The polyol can be, for example, glycerol, ethylene glycol, diethylene glycol, or pentaerythritol. When polyols are used, the rosin acids can be reacted with all of the hydroxyl groups or any fraction of the hydroxyl groups on the polyol. For example, rosin esters formed using glycerol as the polyol can be a mono-ester, di-ester, or ternary-ester while rosin esters formed using pentaerythritol as the polyol can be a mono-ester, di-ester, ternary ester, or quaternary ester. A mono-ester is formed by reacting rosin acid with an alcohol or one hydroxyl group of a polyol. Di-esters, ternary esters, and quaternary esters can be formed by reacting rosin acid with two, three, or four hydroxy groups respectively of a polyol. A mixture of rosin esters can be present.

Examples of useful commercially available rosin esters and acids include, for example, SYLVALITE RE100 and SYLVACOTE 6101 available from Arizona Chemical, Jacksonville, Fla., PENSEL GA90, GB 120 and C available from Arakawa Chemical.

Resins comprising modified rosin esters and acids include, for example, maleic-modified, fumaric-modified and phenolic-modified rosin resins. Rosin can be reacted with a dibasic acid such as maleic anhydride or fumaric acid or with phenol and then esterifying or acidifying the modified rosin. Maleic-modified rosin acids and esters can be produced, for example, by adducting maleic anhydride to the rosin and then esterifying or acidifying the maleic-modified rosin.

Preferably, the compositions of the invention comprise a maleic-modified rosin ester (MMRE). Examples of useful commercially available MMREs include, for example, SYLVACOTE 4973, 7021 and 7118 available from Arizona Chemical, Jacksonville, Fla., and LEWISOL 28-M and 29-M and PENTALYN 350-M available from Eastman Chemical, Kingsport, Tenn.

In some embodiments, the compositions of the invention may comprise one or more additional thermoplastic binders in addition to the C5 hydrocarbon resin or rosin resin. Useful thermoplastic binders can be selected from natural and synthetic rubbers and resins and mixtures of them in proper combinations. Examples of useful binders include aliphatic type petroleum resins; petroleum type hydrocarbon resins such as polybutene, coumarone resins such as coumarone-indene resin; phenol resins such as phenol-formaldehyde resin; terpene type resins such as terpene-phenol resin, polyterpene resin; synthetic polyterpene resins; aromatic hydrocarbon resins; unsaturated hydrocarbon polymers; isoprene type resins; hydrogenated hydrocarbon resins; and hydrocarbon type pressure-sensitive adhesive resins. In some embodiments, ethylene-vinyl acetate copolymers, ethylene acrylic acid copolymers, polypropylene, polyethylene and the like are preferred secondary resins.

Polydimethylsiloxane Polyamide Copolymer

The compositions of the invention comprise a polydimethylsiloxane polyamide copolymer.

Examples of useful polydiorganosiloxane polyamide copolymers include those shown below in Formulae XXI, XXIII and XXV below. The polydiorganosiloxane polyamide copolymers of Formulae XXI, XXIII and XXV (below) can be prepared by any known method. In some embodiments, these compounds are prepared according to Reaction Schemes B, C and D.

alkyl, alkoxy, or halo, or a combination thereof. Each Y is independently an alkylene, aralkylene, or a combination thereof. Each Z is independently a hydrogen, alkyl, aryl,

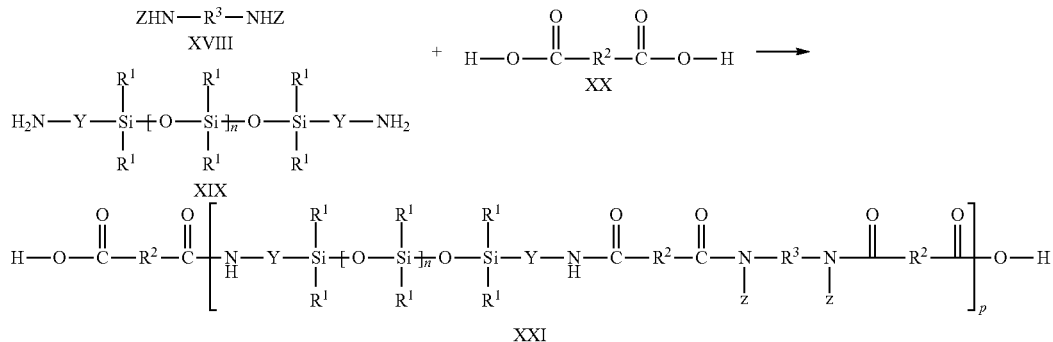

Reaction Scheme B

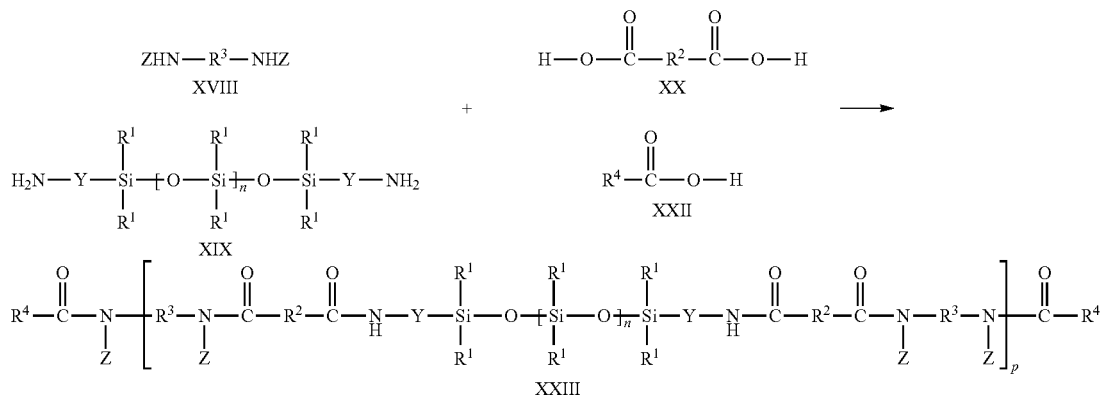

Reaction Scheme C

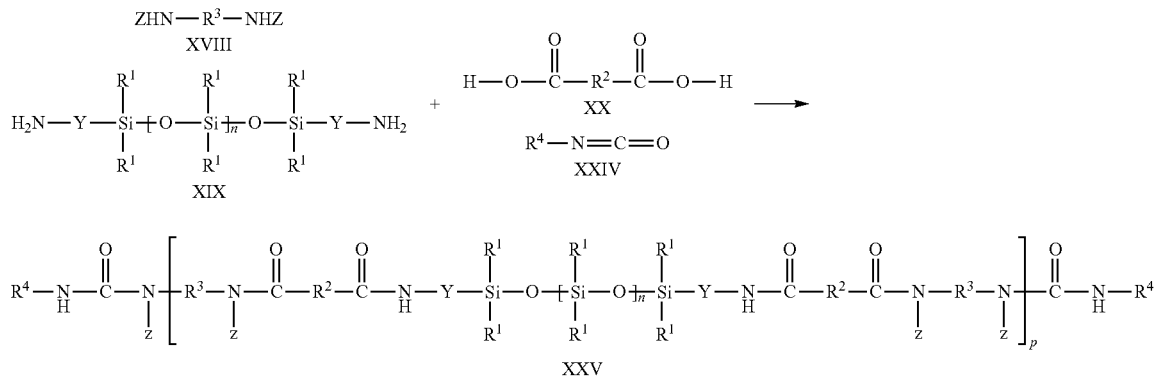

Reaction Scheme D

Each $R^1$ is independently an alkyl, aralkyl, alkenyl, aryl, or aryl substituted with an alkyl, alkoxy, or halo. Each $R^2$ is independently an alkylene, aralkylene, heteroalkylene, or a combination thereof, or a C—C covalent bond. Each $R^3$ is independently an alkylene, aralkylene, heteroalkylene or a combination thereof. Each $R^4$ is independently an alkyl, aralkyl, heteroalkyl, alkenyl, aryl, or aryl substituted with an alkylene or a combination thereof. Subscript n is independently an integer of 0 to 1500 and subscript p is an integer of 1 to 100.

Suitable alkyl groups for $R^1$ typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

Suitable alkylene groups for $R^2$ and $R^3$ typically have up to 36 carbon atoms, up to 24 carbon atoms, up to 12 carbon atoms, or up to 6 carbon atoms. Exemplary alkylene groups for $R^2$ and $R^3$ include methylene, ethylene, propylene, butylene, and the like. Suitable heteroalkylene groups for $R^2$ are alkylene groups having one or more carbon atoms replaced with a sulfur, oxygen, N—H, N—$R^3$, or N-alkyl. Suitable heteroalkylene groups for $R^3$ are alkylene groups having one or more carbon atoms replaced with a sulfur, oxygen, or N-alkyl. Suitable aralkylene groups for $R^2$ and $R^3$ usually have an arylene group with 6 to 12 carbon atoms bonded to an alkylene group with 1 to 20 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to $R^2$ and $R^3$, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 20, 1 to 10, or 1 to 6 carbon atoms.

Suitable alkyl groups for $R^4$ typically have 1 to 20, 1 to 10, 1 to 6, or 1 to 4 carbon atoms. Exemplary alkyl groups include, but are not limited to, methyl, ethyl, isopropyl, n-propyl, n-butyl, and iso-butyl. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^4$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^4$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group). Suitable heteroalkyl groups have at least two carbon atoms and at least on caternary heteroatom such as sulfur, nitrogen or oxygen.

Each Y is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each Z is independently a hydrogen, alkyl, aryl, alkylene or a combination thereof. Suitable alkyl groups have up to 20 carbons, up to 10 carbons, up to 8 carbons, up to 6 carbons, up to 4 carbons, up to 2 carbons or up to 1 carbon. Suitable aryl groups have either 6 or 12 carbons. Suitable aralkyl groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Z, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms. In some embodiments, the Z groups may form a covalent bond such that a Formula XVIII compound forms a heterocyclic ring. An exemplary structure with this formula is piperazine. In other embodiments, each Z group may independently form a covalent bond with the $R^3$ group to form heterocyclic structures. Exemplary structures with this formula are 4-aminoethylpiperazine and 1,3-(di-4-piperidino)propane.

Each subscript n is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

The subscript p is an integer of 1 to 100. For example, the value of p is often an integer up to 90, up to 80, up to 70, up to 60, up to 50, up to 40, up to 30, up to 20, up to 10, up to 5, or up to 2. The value of p can be in the range of 1 to 80, 1 to 60, 1 to 40, 1 to 20 or 1 to 10.

Suitable examples of Formula XX include, but are not necessarily limited to, ethanedioic acid, propanedioic acid, butanedioic acid, pentanedioic acid, hexanedioic acid, heptanedioic acid, octanedioic acid, nonanedioic acid, decanedioic acid, undecanedioic acid, dodecanedioic acid, phthalic acid, isophthalic acid, terephthalic acid, any of the diacids available under the PRIPOL tradename from Croda USA (Edison, N.J.) or under the EMPOL tradename from BASF (Florham Park, N.J.).

Suitable examples of Formula XVIII include, but are not necessarily limited to, ethanediamine, propanediamine, butanediamine, pentanediamine, hexanediamine, heptanediamine, octanediamine, nonanediamine, decanediamine, undecanediamine, dodecanediamine, any of the diamines sold under the PRIAMINE tradename by Croda USA (Edison, N.J.), 1,4-bis(aminomethyl)cyclohexane, bis(4-aminocyclohexyl)methane, 1,3-di-(4-piperidino)propane, 1,2-diaminobenzene, 1,3-diaminobenzene, 1,4-diaminobenzene, p-xylylenediamine, m-xylylenediamine, o-xylylenediamine, piperazine, 4-aminoethylpiperazine, any of the polyoxyalkyleneamines available under the JEFFAMINE tradename from Huntsman Corp (Salt Lake City, Utah) or any of the polyamines such as diethylenetriamine, triethylenetetramine, tetraethylenepentamine.

Suitable examples of Formula XXII include, but are not necessarily limited to, ethanoic acid, propanoic acid, butanoic acid, pentanoic acid, hexanoic acid, heptanoic acid, octanoic acid, nonanoic acid, decanoic acid, undecanoic acid, dodecanoic acid, tetradecanoic acid, hexadecanoic acid, octadecanoic acid and phthalic acid. Suitable examples of Formula XXIV include, but are not necessarily limited to, butylisocyanate, pentylisocyanate, hexylisocyanate, heptylisocyanate, octylisocyanate, nonylisocyanate, decylisocyanate, dodecylisocyanate, tetradecylisocyanate, hexadecylisocyanate, octadecylisocyanate, phenylisocyanate, p-toluylisocyanate.

The polydimethylsiloxane diamine of Formula XIX in Reaction Scheme B can be prepared by any known method and can have any suitable molecular weight, such as an average molecular weight in the range of 700 to 150,000 g/mole. Suitable polydiorganosiloxane diamines and methods of making the polydiorganosiloxane diamines are described, for example, in U.S. Pat. No. 3,890,269 (Martin), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), and U.S. Pat. No. 6,355,759 (Sherman et al.). Some polydiorganosiloxane diamines are commercially available, for example, from Shin Etsu Silicones of America, Inc., Torrance, Calif. and from Gelest Inc., Morrisville, Pa.

A polydiorganosiloxane diamine having a molecular weight greater than 2,000 g/mole or greater than 5,000 g/mole can be prepared using the methods described in U.S. Pat. No. 5,214,119 (Leir et al.), U.S. Pat. No. 5,461,134 (Leir et al.), and U.S. Pat. No. 5,512,650 (Leir et al.). One of the described methods involves combining under reaction conditions and under an inert atmosphere (a) an amine functional end blocker of the following formula

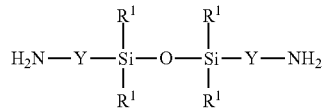

where Y and $R^1$ are the same as defined above (b) sufficient cyclic siloxane to react with the amine functional end blocker to form a polydiorganosiloxane diamine having a molecular weight less than 2,000 g/mole; and (c) an anhydrous aminoalkyl silanolate catalyst of the following formula

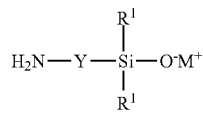

where Y and $R^1$ are the same as defined above and $M^+$ is a sodium ion, potassium ion, cesium ion, rubidium ion, or tetramethylammonium ion. The reaction is continued until substantially all of the amine functional end blocker is consumed and then additional cyclic siloxane is added to increase the molecular weight. The additional cyclic siloxane is often added slowly (e.g., drop wise). The reaction temperature is often conducted in the range of 80° C. to 90° C. with a reaction time of 5 to 7 hours. The resulting polydiorganosiloxane diamine can be of high purity (e.g., less than 2 weight percent, less than 1.5 weight percent, less than 1 weight percent, less than 0.5 weight percent, less than 0.1 weight percent, less than 0.05 weight percent, or less than 0.01 weight percent silanol impurities). Altering the ratio of the amine end functional blocker to the cyclic siloxane can be used to vary the molecular weight of the resulting polydiorganosiloxane diamine of Formula XIX.

Another method of preparing the polydiorganosiloxane diamine of Formula XIX includes combining under reaction conditions and under an inert environment (a) an amine functional end blocker of the following formula

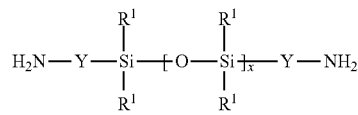

where $R^1$ and Y are the same as described above and where the subscript x is equal to an integer of 1 to 150; (b) sufficient cyclic siloxane to obtain a polydiorganosiloxane diamine having an average molecular weight greater than the average molecular weight of the amine functional end blocker; and (c) a catalyst selected from cesium hydroxide, cesium silanolate, rubidium silanolate, cesium polysiloxanolate, rubidium polysiloxanolate, and mixtures thereof. The reaction is continued until substantially all of the amine functional end blocker is consumed. This method is further described in U.S. Pat. No. 6,355,759 B1 (Sherman et al.). This procedure can be used to prepare any molecular weight of the polydiorganosiloxane diamine.

Yet another method of preparing the polydiorganosiloxane diamine of Formula XIX is described in U.S. Pat. No. 6,531,620 B2 (Brader et al.). In this method, a cyclic silazane is reacted with a siloxane material having hydroxy end groups as shown in the following reaction.

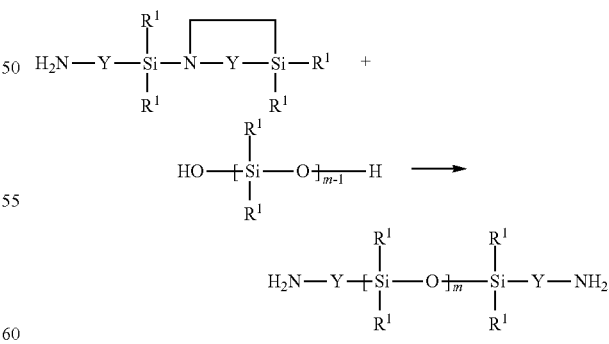

The groups $R^1$ and Y are the same as described above. The subscript m is an integer greater than 1.

Examples of polydiorganosiloxane diamines include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures thereof.

The polydimethylsiloxane polyamide copolymers of Formula XXI can be prepared by reacting the compounds of Formulae XIX, XX and XVIII in the presence of a solvent that forms an azeotrope with water. It is required that the solvent is not reactive with the compounds of Formulae XIX, XX and XVIII. It is not necessary for the compound of Formulae III, IV and V to be completely soluble in the solvent. Examples of useful solvents that form an azeotrope with water include heptanes, toluene and xylene and mixtures thereof. The mixture can be refluxed and the water of condensation by-product can be removed using a Dean-Stark apparatus. The reaction may be carried out until no further water is collected. At this stage, the solvent can be distilled off by raising the temperature and introducing a vacuum in the flask until the solvent is removed to an acceptable limit. Examples of typical temperatures are about 140° C. to about 240° C. Examples of typical vacuum are about 100 mm Hg to about 0.1 mm Hg. The polymer can then be collected by a variety of methods such as draining into trays or pelletization.

The polydimethylsiloxane polyamide copolymers of Formula XXIII can be prepared by reacting the compounds of Formulae XIX, XX, XVIII and optionally XXII in the presence of a solvent that forms an azeotrope with water. Added requirements for the solvent are that it is not reactive with the compounds of Formulae XIX, XX and XVIII. It is not necessary for the compounds of Formulae XIX, XX, XVIII and VXXII to be completely soluble in the solvent. The mixture can be refluxed and the water of condensation by-product can be removed using a Dean-Stark apparatus. The reaction may be carried out until no further water is collected. If the compound of Formula XXII was not present in the reaction initially then it can be introduced at this stage and the resulting water of condensation can be removed via azeotropic distillation. Once no further water is collected, the solvent can be distilled off by raising the temperature and introducing a vacuum in the flask until the solvent is removed to an acceptable limit. Examples of typical temperatures are about 140° C. to about 240° C. Examples of typical vacuum are about 100 mm Hg to about 0.1 mm Hg. The polymer can then be collected by a variety of methods such as draining into trays or pelletization.

The polydimethylsiloxane polyamide copolymers of Formula XXV can be prepared by reacting the compounds of Formulae XIX, XX, and XVIII in the presence of a solvent such as toluene that is known to those skilled in the art to form an azeotrope with water. Added requirements for the solvent are that it is not reactive with the compounds of Formulae XIX, XX, and XVIII. It is not necessary for the compound of Formulae III, IV and V to be completely soluble in the solvent. The mixture can be refluxed and the water of condensation by-product can be removed using a Dean-Stark apparatus. The reaction can be carried out until no further water is collected. The compound of Formula XXIV can be introduced at this stage and the mixture allowed to be stirred until the reaction is complete. Once the reaction is complete, the solvent can be distilled off by raising the temperature and introducing a vacuum in the flask until the solvent is removed to an acceptable limit. Examples of typical temperatures are about 140° C. to about 240° C. Examples of typical vacuum are about 100 mm Hg to about 0.1 mm Hg. The polymer can then be collected by a variety of methods such as draining into trays or pelletization.

Those of skill in the art will appreciate that other methods for preparing polydimethylsiloxane polyamides may be utilized including, for example, the methods described in U.S. Pat. Nos. 5,407,986 or 6,503,632.

Polydimethylsiloxane polyamide copolymers with an average molecular weight of about 5,000 g/mole to about 1,000,000 g/mole can be prepared as described in above. Polydimethylsiloxane diamine with an average molecular weight of about 14,000 g/mole or with an average molecular weight of about 33,000 g/mole can be prepared as described in U.S. Pat. No. 6,355,759. These polydimethylsiloxane diamines can be used to prepare polydimethylsiloxane polyamide copolymers with average molecular weight from about 20,000 g/mole to about 1,000,000 g/mole.

In some embodiments, the average molecular weight of the polydimethylsiloxane polyamide copolymer is from about 5000 or about 10,000 g/mole to about 50,000, about 100,000, about 250,000, about 500,000 or about 1,000,000 g/mole.

In some embodiments of the invention, the compositions of the invention comprise about 0.5 or about 1 wt. % to about 5 or about 10 wt. polydimethylsiloxane polyamide copolymer.

Plasticizer

In some embodiments of the invention, the compositions comprise plasticizer. Suitable plasticizers include, but are not necessarily limited to, dicarboxylic or tricarboxylic ester-based plasticizers such as dimethyl phthalate, bis(2-ethylhexyl) phthalate (DEHP), diisonoriyl phthalate (DINP), bis(n-butyl)phthalate (DnBP, DBP), butyl benzyl phthalate (BBzP) diisodecyl phthalate (DIDP), di-n-octyl phthalate (DOP or DnOP), di-n-nonyl phthalate, di-n-undecyl phthalate, diundecyl phthalate, di-n-hexyl phthalate, di-n-heptyl phthalate, ditridecyl phthalate, undecyldodecyl phthalate, di(2-propylheptyl phthalate), nonylundecyl phthalate, alkylbenzyl phthalate, C7-C9 butyl phthalate, texanolbenzylphthalate, polyester phthalate, diallylphthalate, n-butylphthalyl-n-butyl glycosate, dicaprylphthalate, butylcyclohexyl phthalate, dicyciohexyl phthalate or butyl octyl phthalate, diisooctyl phthalate (DIOP), diethyl phthalate (DEP), diisobutyl phthalate (DIBP); trimellitates such as trimethyl trimellitate (TMTM), trioctyl trimellitate, triisooctyl trimellitate, tri isorionyl trimellitate, triisodecyl trimellitate, tri-n-hexyl trimellitate, tri-(2-ethythexyl) trimellitate (TEHTM-MG), tri-(n-octyln-decyl) trimellitate (ATM), tri-(heptylnanyl)trimellitate (LTM), moctyl trimellitate (OTM); adipates, sebacates, giutarates, azelates or maleates such as bis(2-ethylhexyl)adipate (DEHA), dimethyl adipate (DMAD), mono-methyl adipate (MMAD), diisonyl adipate, diisooctyl adipate, diisodecyl adipate, di tridecyl adipate, dibutoxyethyl adipate, dibutoxyethoxy adipate, undecyl)adipate, polyester adipate, poly glycol adipates, dioctyl adipate (DOA), dioctyl azelate, di-2-ethylhexyl glutarate, di-2-ethyl hexyl sebecate, dibutoxyethyl sebecate, dibutyl sebecate (DBS), dibutyl maleate (DBM), diisobutyl maleate (DIBM); benzoates such as isodecyl benzoate, diethylene glycol dibenzoate, dipropylene glycol dibenzoate, triethylene glycol dibenzoate 1,4 cyclohexane dimethanol dibenzoate, 2,2,4 trimethyl-1,3 pentane diol dibenzoate, 2-ethylhexyl benzoate, C9 benzoate's, C10 benzoates, texanolbenzoate, ethylene glycol dibenzoate, propylene glycol dibenzoate, triethylene glycol dibenzoate, 2,2,-dimethyl-1,3 propanediol dibenzoate, pentaerythritol tetrabenzoate, glycerol itibenzoate, polypropylene glycol dibenzoate; epoxidized vegetable oils; sulfonamides such as N-ethyl toluene sulfonamide (o/p ETSA), ortho and para isomers, N-(2-hydroxypropyl)benzene sulfonamide (HP BSA), N-(n-butyl) benzene sulfonamide (BBSA-NBBS); organophosphates such as tricresyl phosphate (TCP), triarylphosphates, tributyl phosphate (TBP); glycols or polyethers such as triethylene glycol dihexanoate (3G6, 3GH), tetraethylene glycol diheptanoate (4G7), glycerol triacetate (triacetin); polymeric plasticizers; polybutene; or biodegradable plasticizers such as acetylated monoglycerides; alkyl citrates such as triethyl citrate (TEC), acetyl triethyl citrate (ATEC), tributyl citrate (TBC), acetyl tributyl citrate (ATBC), trioctyl citrate (TOC), acetyl trioctyl citrate (ATOC), trihexyl citrate (THC), acetyl trihexyl citrate (ATHC), butyryl trihexyl citrate (BTHC, trihexyl o-butyryl citrate), trimethyl citrate (TMC), C10-C21 alkane phenol esters or alkyl sulphonic acid phenyl ester (ASE), acetic acid reaction products with fully hardened castor oil, diisononyl cyclohexane 1,2 dicarboxylate, polymers of adipic acid/ phthalates/adipates/sebecates/with glycols and often acid terminated, 2,2,4-trimethyl-1,3-pentanediol diisobutyrate, and 1,2-Cyclohexane dicarboxylic acid diisononyl ester. The aforestated plasticizers can be used alone or in combination.

Examples of useful commercially available plasticizers include, for example, MESAMOLL available from Lanxess, Pittsburgh, Pa.; RHODIASOLV IRIS available from Rhodia, Bristol, Pa.; EASTMAN 168 available from Eastman Chemical, Kingsport, Tenn.; and PRIFER 6813 available from Croda USA, Edison, N.J.

In some embodiments of the invention, the compositions of the invention comprise about 0.1 wt. % to about 3 or 4 wt. % plasticizer.

Wax Additive

In some embodiments of the invention, the compositions comprise a wax such as, for example, a polyethylene or a polypropylene wax to improve film properties and application properties. Natural waxes like bee's wax, paraffin, carnauba wax and montan wax as well as other synthetic waxes can also be utilized. Useful waxes typically have an average molecular weight of about 450 g/mole to about 3000 g/mole.

In some embodiments of the invention, the compositions comprise about 1 wt. % to about 5 or about 10 wt % of a wax.

Optical Elements

The compositions and/or pavement markings of the present application may include optical components. Exemplary optical components include, for example, transparent microspheres (i.e., beads), optical elements, and combinations thereof. The optical components may have any desired shape, with spheroidal shapes being preferred. Exemplary transparent microspheres for use in the compositions and articles of the present application include those having a refractive index between about 1.4 and about 2.6. Exemplary transparent microspheres include, for example, glass beads having a refractive index between about 1.4 to about 2.26, and transparent, solid microspheres such as those disclosed in U.S. Pat. No. 6,245,700 (Budd), U.S. Pat. No. 6,511,739 (Kasai), U.S. Pat. No. 7,524,779 (Frey), and U.S. Pat. No. 7,513,941 (Frey). Exemplary glass beads include those disclosed in U.S. Pat. No. 4,564,556 (Lange) and U.S. Pat. No. 4,758,469 (Lange). These glass beads are described generally as solid, transparent, non-vitreous, ceramic spheroids having at least one metal oxide phase.

Exemplary optical elements for use in the compositions and articles of the present application include those having a refractive index between about 1.5 and about 2.4. Exemplary optical elements include aggregates (i.e., a polymer matrix with transparent spheres and/or bonded core elements dispersed therein) and bonded core elements (i.e., materials having a core and a plurality of transparent spheres adhered to the core) such as, for example, those described in U.S. Pat. No. 5,942,280 (Mathers), U.S. Pat. No. 3,043,196 (Palmquist, et al.), U.S. Pat. No. 3,556,637 (Palmquist, et al.), and U.S. Pat. No. 3,171,827 (de Vries, et al.).

In some embodiments of the invention, the compositions comprise about 15 wt. % to about 40 wt. % optical elements.

Whitening Agents and Pigments

The compositions of the invention can comprise one or more of whitening agents, dye particles, colorants and pigments.

Examples of useful organic pigments include Halogenated copper phthalocyanines, Aniline Blacks, Anthraquinone blacks, Benzimidazolones, Azo condensations, Arylamides, Diarylides, Disazo condensations, Isoindolinones, Isoindolines, Quinophthalones, Anthrapyrimidines, Flavanthrones, Pyrazolone oranges, Perinone oranges, Beta-naphthols, BON arylamides, Quinacridones, Perylenes, Anthraquinones, Dibromanthrones, Pyranthrones, Diketopyrrolopyrrole pigments (DPP), Dioxazine violets, Copper & Copper-free phthalocyanines, Indanthrones, and the like. Examples of useful inorganic pigments include Titanium dioxide, Zinc oxide, Zinc sulphide, Lithopone, Antimony oxide, Barium sulfate, Carbon Black, Graphite, Black Iron Oxide, Black Micaceous Iron Oxide, Brown Iron oxides, Metal complex browns, Lead chromate, Cadmium yellow, Yellow oxides, Bismuth vanadate, Lead chromate, Lead molybdate, Cadmium red, Red iron oxide, Prussian blue, Ultramarine, Cobalt blue, Chrome green (Brunswick green), Chromium oxide, Hydrated chromium oxide, Organic metal complexes, laked dye pigments and the like.

Exemplary whitening agents include, for example, $TiO_2$, barium sulfate, and zinc oxide. In embodiments including $TiO_2$, the composition may include, for example, from about 0.1 or about 0.5 or about 5 wt. % to about 5 or about 10 or about 15 wt. % $TiO_2$.

In some preferred embodiments, the compositions of the invention comprise a whitening agent or a yellow organic pigment. In some embodiments, the composition comprises from about 0.5 wt. % to about 2.5 wt. % organic yellow pigment.

Filler

The compositions of the invention can comprise one or more fillers. Useful fillers are typically solids that are non-reactive with the other components of the compositions of the invention. Useful fillers include, for example, clay, talc, glass particles (e.g., frit or fibers), glass beads, metal oxide particles, silica particles, ceramic microspheres, hollow polymeric microspheres (such as those available under the trade designation EXPANCEL 551 DE from Akzo Nobel, Duluth, Ga.), hollow glass microspheres (such as those available under the trade designation K37 from 3M Co., St Paul, Minn.), carbonates, metal oxides, silicates (e.g. talc, asbestos, clays, mica), sulfates, silicon dioxide and aluminum trihydrate.

Some specific examples include ground or light calcium carbonate (with or without a surface-treatment such as a fatty acid, resin acid, cationic surfactant, or anionic surfactant); magnesium carbonate; talc; sulfates such as barium sulfate; alumina; metals in powder form (e.g., aluminum, zinc and iron); bentonite; kaolin clay; quartz powder; and combinations of two or more.

The filler can also comprise conductive particles (see, for example, U.S. Patent Application Pub. No. 2003/0051807) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like. It is also possible to use non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal or the like.

Preferred fillers include inorganic solids such, for example, talc, silica, zirconia, calcium carbonate, calcium magnesium carbonate, glass or ceramic microspheres, and combinations thereof. In some embodiments, calcium carbonate is preferred.

Features/Uses of the Compositions

The compositions described herein can be used as pavement marking compositions. The compositions can form a hot melt extrusion roadway marking, a hot melt spray roadway marking, a hot melt hand-applied roadway marking, a preformed extruded roadway marking, an extruded roadway marking, a pavement marking tape, a pavement marking paint.

In some embodiments, the compositions described herein can be heated to form a mixture. In some embodiments, the mixture is a homogeneous mixture.

The pavement marking composition may be applied to the transportation surface by any suitable means, including, for example, extrusion, flame-spraying, and coating on a web followed by application to a roadway.

In some embodiments, pavement markings are applied to a roadway using a pavement marking application device. This can be referred to as, for example, a hot-melt extrusion process, and one exemplary hot-melt extrusion process is described in U.S. Pat. No. 3,902,666 (Sakai), incorporated herein by reference. Optical components may then be added to the extruded pavement marking before the material has cooled and hardened, as described in PCT Publication No. 2007/092635 (Nagaoka).

In some embodiments, pavement markings are applied to a roadway using a flame-spraying process. In at least some of these embodiments, the composition can be applied using commercially-available flame-spray equipment for pavement marking applications, such as the devices described in U.S. Pat. No. 3,279,336 (Eden et al.), U.S. Pat. No. 3,393,615 (Micheln), and U.S. Pat. No. 3,874,801 (White).

The pavement marking composition may also be formed into a preformed marking, wherein the binder and filler are mixed, melted, pressed into a film, cooled, and later reheated and applied directly onto the transportation surface using a torch or other localized heating source, as described in U.S. Pat. No. 4,490,432 (Jordan).

The pavement marking composition may also be formed into a profiled audible or vibratory pavement marking which has a profile such that the leading and trailing edges of the bump are sloped at a sufficient angle to create an audible warning to drivers.

The pavement marking composition may also be used in a pavement marking tape, wherein the binder and filler are cast as a film, as generally described in U.S. Pat. No. 4,117,192 (Jorgensen), U.S. Pat. No. 4,248,932 (Tung, et al), U.S. Pat. No. 5,643,655 (Passarino), and U.S. Pat. No. 5,563,569 (Lasch, et al), all of which are incorporated herein by reference. The top surface of the tape can have protrusions such as disclosed in U.S. Pat. No. 4,388,359 (Ethen, et al), U.S. Pat. No. 4,988,555 (Hedblom), U.S. Pat. No. 5,557,461 (Wyckoff), U.S. Pat. No. 4,969,713 (Wyckoff), U.S. Pat. No. 5,139,590 (Wyckoff), U.S. Pat. No. 5,087,148 (Wyckoff), U.S. Pat. No. 5,108,218 (Wyckoff), and U.S. Pat. No. 4,681,401 (Wyckoff), all of which are incorporated herein by reference.

The compositions of the present application can be used to form a marked transportation surface. Exemplary transportation surfaces are those made of, for example, pavement, asphalt, concrete, and bricks. Transportation surfaces to which the pavement marking materials of the present application can be applied include, for example, roadways, walkways, bicycle paths, curbs, traffic barriers, barricades, steps, parking lots, and other transportation-related horizontal, inclined or vertical surfaces. The term "pavement" will be used herein and is meant to include all possible transportation surfaces. The pavement marking on the transportation surface can have a thickness of, for example, between about 0.05 cm and about 3 cm, and preferably between 0.13 and 2 mm. Pavement markings can be in the form of any desired indicia including, for example, stripes, text, graphics, and other symbols.

The retroreflectivity of pavement markings provides visual guidance for drivers. This visibility is particularly important for nighttime driving. Retroreflectivity diminishes as the pavement marking surface erodes (e.g., the microspheres become dislodged or are damaged). Pavement markings according to the present disclosure exhibit good retroreflectivity and retain this retroreflectivity during usage.

Contrast between pavement markings and transportation surfaces results in increased visibility. The pavement markings according to the present disclosure have improved hydrophobic surface properties and thus may provide for improved whiteness retention and reduced dirt pickup when used in pavement markings thereby improving their performance on the road.

EXAMPLES

Objects and advantages of this invention are further illustrated by the following examples, but the particular materials and amounts thereof recited in these examples, as well as other conditions and details, should not be construed to unduly limit this invention.

Materials

| Trade Designation/ Chemical Name | Description | Supplier |
| --- | --- | --- |
| SYLVACOTE 4973 | Maleic-modified rosin ester | Arizona Chemical, Jacksonville, FL |
| SYLVALITE RE100 | Rosin ester with high softening point | Arizona Chemical |
| EPOLENE C-16 | Branched low density polyethylene modified with maleic anhydride | Westlake Chemical Corporation, Houston, TX |
| EASTMAN 168 | Non-phthalate plasticizer | Eastman Chemical, Kingsport, TN |
| OMYACARB 5FL | Calcium carbonate | Omya, Inc, Proctor, VT |
| TI-PURE R-900 | Rutile titanium dioxide pigment | DuPont Titanium Technologies, Wilmington, DE |
| REFLEX BEADS | 1.5 refractive index sodalime glass beads (Type I) | Swarco America, Columbia, TN |
| REFLEX BEADS | 1.5 refractive index Megalux beads (Type III) | Swarco America, Columbia, TN |
| PLUS9BEADS | 1.9 refractive index glass beads (Type III) | Swarco America |
| EMPOL 1061 | Distilled dimer acid based on tall oil fatty acid | BASF Corp., Florham Park, NJ |
| PRIPOL 1013 | Distilled dimer acid based on tall oil fatty acid | Croda USA, Edison, NJ |

-continued

| Trade Designation/ Chemical Name | Description | Supplier |
|---|---|---|
| 1,6-DIAMINOHEXANE | Aliphatic diamine | Sigma-Aldrich Chemical Co., Milwaukee, WI |
| TOLUENE | Aromatic Solvent | Avantor Performance Materials, Center Valley, PA |
| NAUGARD PS-30 | Amine-based antioxidant | Chemtura, Middlebury, CT |
| IRGANOX 1035 | Phenolic antioxidant | BASF Corp., Florham Park, NJ |

Synthesis of Silicone Diamine 14K

An amine-terminated polydimethylsiloxane having an average molecular weight of about 14000 g/mol was prepared as generally described in U.S. Pat. No. 6,335,759 (Sherman et al), incorporated its entirety herein in by reference.

Synthesis of Silicone Diamine 33K

An amine-terminated polydimethylsiloxane having an average molecular weight of about 33000 g/mol was prepared as generally described in U.S. Pat. No. 6,335,759 (Sherman et al), incorporated its entirety herein in by reference.

Synthesis of PDMS-PA 14K

A polydimethylsiloxane polyamide copolymer (PDMS-PA 14K) was prepared according to the following procedure. A 1 L cylindrical heavy wall flask equipped with a flask head that was fitted with an overhead mechanical stirrer, ice-water cooled condenser with a Dean-Stark receiver and a thermocouple was charged with 300 g of EMPOL 1061, 39.6 g of the silicone diamine, 57.1 g of 1,6-diaminohexane and 150 mL of toluene. The flask was heated with stirring to a reflux using an electrically heated mantle and variable voltage controller. A nitrogen bleed was maintained at the top of the condenser throughout the reaction. Shortly after commencement of the reflux, water began to be collected in the Dean-Stark receiver. The reflux was allowed to continue for 48 hours at which point, 15 mL of water had collected in the Dean-Stark receiver. At this point, the reaction temperature was raised to 225° C. and the toluene was stripped off. The reaction was maintained at 225° C. with stirring for 1 hour following which a 40 mm Hg vacuum was introduced in the reactor for 6 hours. Subsequently, the vacuum was vented with nitrogen and 5.7 g of NAUGARD PS-30 was added to the reaction with stirring. The reaction was stirred for an additional 30 minutes and then drained without cooling to a poly(tetrafluoroethylene) coated steel tray where it was allowed to cool to ambient temperature. The material was isolated as a yellow, opaque sheet of material.

Synthesis of PDMS-PA 33K

A polyamide-terminated polydimethylsiloxane (PDMS-PA 33K) was prepared according to the following procedure. A 5 L round bottom flask equipped with a flask head that was fitted with an overhead mechanical stirrer, ice-water cooled condenser with a Dean-Stark receiver and a thermocouple was charged with 1948 g of EMPOL 1061, 258 g of the silicone diamine 33K, 372 g of 1,6-diaminohexane and 600 mL of toluene. The flask was heated with stirring to a reflux using an electrically heated mantle and variable voltage controller. A nitrogen bleed was maintained at the top of the condenser throughout the reaction. Shortly after commencement of the reflux, water began to be collected in the Dean-Stark receiver. The reflux was allowed to continue for 24 hours at which point, 112 mL of water had collected in the Dean-Stark receiver. At this point, the reaction temperature was raised to 225° C. and the toluene was stripped off. The reaction was maintained at 225° C. with stirring for 1 hour following which a 35 mm Hg vacuum was introduced in the reactor for 2 hours. Subsequently, the vacuum was vented with nitrogen and 37 g of IRGANOX 1035 was added to the reaction with stirring. The reaction was stirred for an additional 15 minutes and then drained without cooling to a poly(tetrafluoroethylene) coated steel tray where it was allowed to cool to ambient temperature. The material was isolated as a yellow, opaque sheet of material.

Test Methods

Contact angle: static water contact angle for compositions of Comparative Example A and Example 1 was measured using a MRL Contact Angle goniometer (model 100-00-115, available from Rame'-Hart, Inc. Mountain Lakes, N.J.). Results are reported as the average of a minimum of six repeat measurements. For compositions of Comparative Example B and Example 2, static water contact angle was measured using a Brighton Surface Analyst Model No. SA1001, obtained from Brighton Technologies Group, Cincinnati, Ohio. Results are reported as the average of a minimum of six repeat measurements.

EXAMPLES

Comparative Examples A-B and Examples 1-2

Pavement marking compositions of Comparative Examples A and B, and Examples 1 and 3 were prepared by adding the ingredients listed in Table 1, below, to a small, one quart paint can. The can was placed in a 400° F. (204° C.) oven for 1 hour. The mixture was subsequently removed from the oven, vigorously hand mixed using a metal spatula and replaced in the oven for an additional 1 hour. The mixture was then removed and vigorously mixed before pouring into aluminum pans or molds for testing.

TABLE 1

| | COMPARATIVE EXAMPLE A (g) | COMPARATIVE EXAMPLE B (g) | EXAMPLE 1 (g) | EXAMPLE 2 (g) |
|---|---|---|---|---|
| SYLVACOTE 4973 | 15.00 | 15.00 | 15.00 | 15.00 |
| SYLVALITE RE100 | 2.75 | 4.00 | 0 | 4.00 |
| EPOLENE C-16 | 1.50 | 0.00 | 0 | 0 |
| UL-7511 | 0 | 1.00 | 0 | 0 |
| EASTMAN 168 | 0.75 | 1.00 | 0.75 | 1.00 |
| OMYACARB 5FL | 30.00 | 29.00 | 30.00 | 24 |
| TI-PURE R-900 | 10.00 | 10.00 | 10.00 | 15.00 |
| REFLEX BEADS | 20.00 | 0.00 | 20.00 | 0 |
| MEGALUX BEADS | 0 | 20.00 | 0 | 20.00 |
| PLUS9BEADS | 20.00 | 20.00 | 20.00 | 20.00 |
| PDMS-PA 14K | 0 | 0 | 4.25 | 0 |
| PDMS-PA 33K | 0 | 0 | 0 | 1.00 |

Water contact angle was measured following the procedure described above. Results are reported in Table 2, below.

TABLE 2

| | Water Contact Angle (o) |
|---|---|
| COMPARATIVE A | 78.4 |
| COMPARATIVE B | 61.8 |
| EXAMPLE 1 | 100.6 |
| EXAMPLE 2 | 85.2 |

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A composition comprising a blend comprising:
   a binder comprising maleic-modified rosin ester resin; and
   a polydiorganosiloxane-polyamide copolymer that is about 0.5 wt. % to about 10 wt. % of the composition, wherein the polydiorganosiloxane-polyamide copolymer has the formula

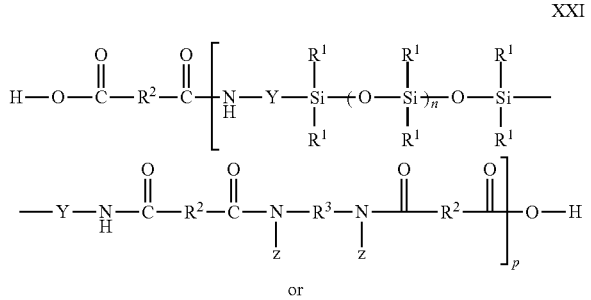

XXI or

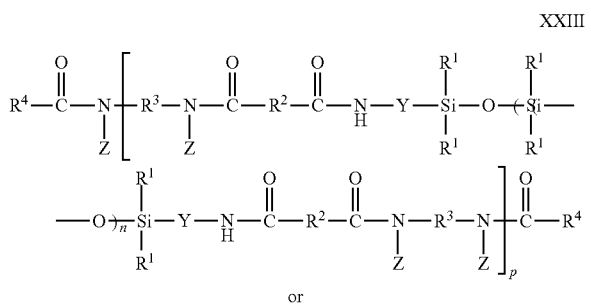

XXIII or

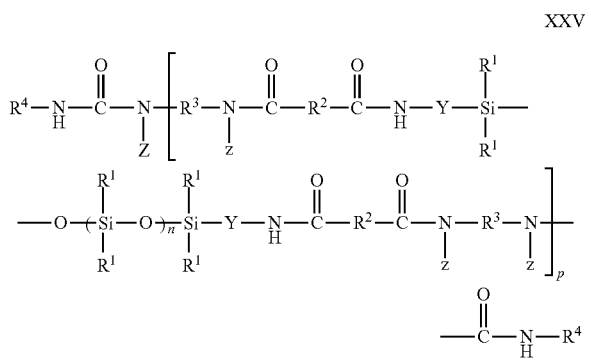

XXV wherein
   each $R^1$ is independently alkyl, aralkyl, alkenyl, aryl, or aryl substituted with alkyl, alkoxy, or halo;
   each $R^2$ is independently an alkylene, aralkylene, heteroalkylene, or a combination thereof, or a C—C covalent bond;
   each $R^3$ is independently an alkylene, aralkylene, heteroalkylene, or a combination thereof;
   each $R^4$ is independently an alkyl, aralkyl, heteroalkyl, alkenyl, aryl, or aryl substituted with alkyl, alkoxy, or halo, or combinations thereof;
   each Y is independently an alkylene, aralkylene, or a combination thereof;
   each Z is independently hydrogen, alkyl, aryl, or a combination thereof;
   n is an integer from 0 to 1500;
   p is an integer from 1 to 100; and
   an optical component comprising transparent glass beads.

2. The composition of claim 1, wherein the transparent glass beads are transparent glass microspheres.

3. The composition of claim 1 further comprising a whitening agent, a yellow pigment, or a combination thereof.

4. The composition of claim 1 further comprising a filler.

5. The composition of claim 1 further comprising a plasticizer.

6. The composition of claim 1 further comprising a wax.

7. The composition of claim 6, wherein the wax is a polyethylene or polypropylene wax.

8. The composition of claim 1, wherein $R^3$ is $C_{1-36}$ alkylene.

9. The composition of claim 8, wherein $R^3$ is hexylene.

10. A thermoplastic pavement marking composition comprising a blend comprising:
   maleic-modified rosin ester resin;
   a polydiorganosiloxane-polyamide copolymer that is about 1 wt. % to about 5 wt. % of the composition, wherein the polydiorganosiloxane-polyamide copolymer has the formula

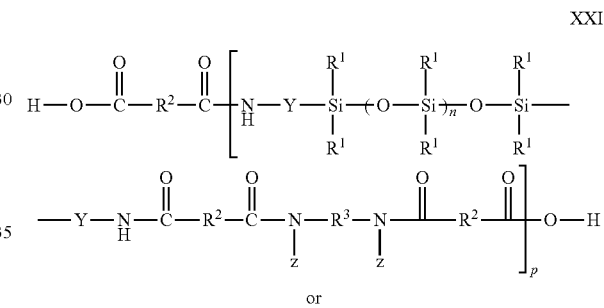

XXI or

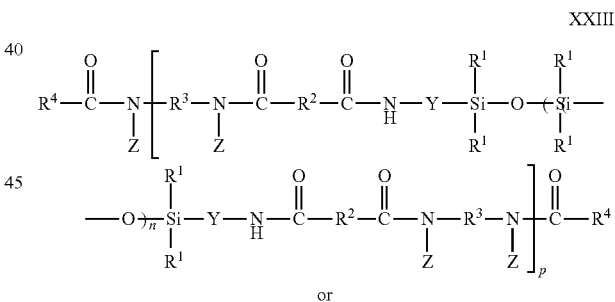

XXIII or

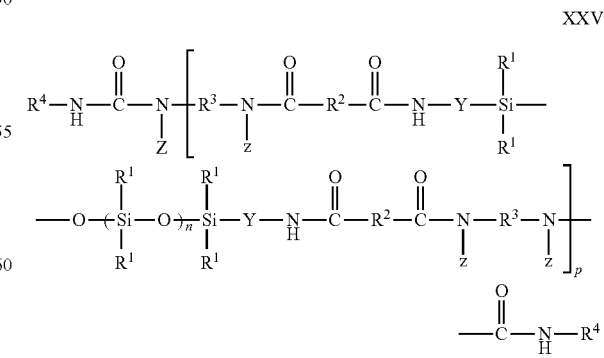

XXV wherein
   each $R^1$ is independently alkyl, aralkyl, alkenyl, aryl, or aryl substituted with alkyl, alkoxy, or halo;

each $R^2$ is independently an alkylene, aralkylene, heteroalkylene, or a combination thereof, or a C—C covalent bond;

each $R^3$ is independently an alkylene, aralkylene, heteroalkylene, or a combination thereof;

each $R^4$ is independently an alkyl, aralkyl, heteroalkyl, alkenyl, aryl, or aryl substituted with alkyl, alkoxy, or halo, or combinations thereof;

each Y is independently an alkylene, aralkylene, or a combination thereof;

each Z is independently hydrogen, alkyl, aryl, or a combination thereof;

n is an integer from 0 to 1500;

p is an integer from 1 to 100;

calcium carbonate filler;

a whitening agent, dye particle, colorant, pigment, or a combination thereof; and transparent glass beads.

11. The pavement marking composition of claim 10, wherein the composition comprises from about 10 wt. % to about 20 wt. % of the maleic-modified rosin ester resin.

12. The pavement marking composition of claim 10, wherein the whitening agent, dye particle, colorant, pigment, or combination thereof is titanium dioxide, yellow organic pigment, or a combination thereof.

13. The pavement marking composition of claim 12, wherein the composition comprises from about 5 wt. % to about 15 wt. % of the titanium dioxide.

14. The pavement marking composition of claim 12, wherein the composition comprises from about 0.5 wt. % to about 2.5 wt. % of the yellow organic pigment.

15. The pavement marking composition of claim 10, wherein the composition comprises from about 15 wt. % to about 40 wt. % of the transparent glass beads.

16. The pavement marking composition of claim 10 further comprising from about 1 wt. % to about 5 wt. % polypropylene or polyethylene wax.

17. The pavement marking composition of claim 10 further comprising plasticizer.

18. The pavement marking composition of claim 17 wherein the composition comprises 0.1 wt. % to about 3 wt. % of the plasticizer.

* * * * *